(12) United States Patent
Hyatt

(10) Patent No.: US 8,467,546 B2
(45) Date of Patent: Jun. 18, 2013

(54) SWITCHABLE AUDIO CIRCUITS FOR MOBILE TERMINALS AND METHODS AND COMPUTER PROGRAM PRODUCTS FOR OPERATING THE SAME

(75) Inventor: Edward Craig Hyatt, Durham, NC (US)

(73) Assignee: Sony Corporation, Tokyo (JP)

( * ) Notice: Subject to any disclaimer, the term of this patent is extended or adjusted under 35 U.S.C. 154(b) by 1518 days.

(21) Appl. No.: 11/168,125

(22) Filed: Jun. 28, 2005

(65) Prior Publication Data

US 2006/0291671 A1    Dec. 28, 2006

(51) Int. Cl.
*H03G 5/00*    (2006.01)

(52) U.S. Cl.
USPC .............................. 381/98; 381/100; 455/3.06

(58) Field of Classification Search
USPC ............... 381/123, 311, 75–81, 110, 74, 106, 381/98–103; 455/567, 3.06; 379/93.09, 93.11, 379/93.01, 110.01; 704/200, 200.1, 201, 704/205, 272, 500, E19.006
See application file for complete search history.

(56) References Cited

U.S. PATENT DOCUMENTS

| | | | | |
|---|---|---|---|---|
| 4,368,435 A * | 1/1983 | Bloy | .............................. | 330/133 |
| 4,457,014 A * | 6/1984 | Bloy | .............................. | 381/98 |
| 4,741,039 A * | 4/1988 | Bloy | .............................. | 381/98 |
| 4,761,814 A * | 8/1988 | Sugai et al. | ...................... | 381/13 |
| 5,559,792 A * | 9/1996 | Bottoms et al. | ................ | 370/276 |
| 5,892,834 A * | 4/1999 | Smart et al. | .................... | 381/106 |
| 6,047,049 A * | 4/2000 | Yoo | ........................... | 379/102.03 |
| 6,389,391 B1 | 5/2002 | Terauchi | | |
| 6,718,298 B1 * | 4/2004 | Judge | ............................ | 704/215 |
| 7,289,626 B2 * | 10/2007 | Carter et al. | ............. | 379/387.02 |
| 2002/0025048 A1 | 2/2002 | Gustafsson et al. | | |
| 2003/0147512 A1* | 8/2003 | Abburi | ....................... | 379/88.22 |
| 2006/0029086 A1 | 2/2006 | Akie | | |

FOREIGN PATENT DOCUMENTS

| | | |
|---|---|---|
| EP | 0736858 A2 | 10/1996 |
| EP | 0 762 711 | 3/1997 |
| JP | 08-335914 | 12/1996 |
| JP | 2004-312125 | 11/2004 |
| JP | 2005-124080 | 5/2005 |

OTHER PUBLICATIONS

International Search Report and Written Opinion of the International Searching Authority for International Patent Application No. PCT/US2005/045323 mailed on Apr. 18, 2006.

Notice of Office Action issued Feb. 19, 2010 during examination of the corresponding Japanese patent application No. 2008-519256 (3 pages).

Notice of Office Action issued Jul. 2, 2010 during examination of the corresponding Japanese patent application No. 2008-519256 (3 pages).

(Continued)

*Primary Examiner* — Vivian Chin
*Assistant Examiner* — Fatimat O Olaniran
(74) *Attorney, Agent, or Firm* — Myers Bigel Sibley & Sajovec, P.A.

(57) ABSTRACT

Audio circuits for a mobile terminal include a microphone and an audio signal processing circuit having an input coupled to the microphone. The audio signal processing circuit has a switchable portion and is configured to switch between a voice mode utilizing the switchable portion and a full fidelity mode not utilizing the switchable portion responsive to a mode signal coupled thereto.

18 Claims, 4 Drawing Sheets

OTHER PUBLICATIONS

Notice of Office Action issued Sep. 13, 2010 during examination of the corresponding Chinese patent application No. 200580050276.X (12 pages).

Notice of Final Office Action issued Nov. 5, 2010 during examination of the corresponding Japanese patent application No. 2008-519256 (4 pages).

* cited by examiner

SWITCHABLE AUDIO CIRCUITS FOR MOBILE TERMINALS AND METHODS AND COMPUTER PROGRAM PRODUCTS FOR OPERATING THE SAME

BACKGROUND OF THE INVENTION

The present invention relates to mobile terminals and methods and computer program products for operating the same and, more particularly, to audio circuits, methods and computer program products for processing an audio signal of such devices.

A variety of consumer devices, including mobile devices, such as mobile terminals, include both a processor and user input/output devices, such as displays, speakers, microphones and the like. For such devices, the processor is generally configured to process different forms of media content, such as audio files, pictures, animations and the like. For mobile terminals, the processor is also generally configured to process voice and/or video content that may be associated with a phone call voice connection established to the mobile terminal or data connection.

For mobile devices such as mobile terminals, the audio input circuit is typically designed to maximize speech sensitivity and minimize background noise. To some extent, this audio processing for these devices is a function of their physical and electronic design, for example, based on the microphone's frequency response characteristics and the electronic band pass filters in the audio input circuit front end. In addition, a digital signal processor (DSP) is typically included in the mobile terminal that does portions of the audio processing to improve speech clarity and/or to remove extraneous information from a received audio input signal to reduce bandwidth utilization for communication of the audio signal over the wireless network or the like. Processing the input audio signal from a microphone in conventional mobile terminals may include front end bandpass filters to suppress frequencies outside the voice (speech) frequency band, audio compression to maximize sound energy within the voice band and/or a voice activated switch (VOX) that silences (ceases to use) the audio input from the microphone and instead inserts "comfort noise" for over air transmission during a voice call and/or the like.

As used herein, "audio compression" refers to a process that increases the sound energy in the voice/speech band. Audio compression is distinct from "data compression," which generally removes or encodes redundant information to reduce the amount of information required to represent a voice input and, thereby, to reduce bandwidth requirements for supporting a voice call or the like. For example, replacing pauses with comfort noise, or an indicator that comfort noise is to be inserted in the receiver, is a data compression technique as are standard compression standards, such as MP3.

A conventional audio path as described above is illustrated in the schematic block diagram of FIG. 1. As seen in the illustrative and schematic diagram of FIG. 1, a microphone 12 is coupled to a pre-amplifier 14 that pre-amplifies an analog electrical signal generated by the microphone 12 representative of sound waves detected by the microphone 12. The output of the pre-amplifier 14 is illustrated coupled to a bandpass filter 16 that is configured to pass only signals in the voice frequency band to thereby remove extraneous noise and the like which may otherwise interfere with the quality of the recordation (detection) of speech received by the microphone 12. The output of the bandpass filter 16 is passed to an analog to digital converter (ADC) 18 and the digitized filtered audio signal is then processed by a digital signal processor (DSP) 20. As noted above, the digital signal processor 20 may be configured to provide further filtering, audio compression, comfort noise insertion and/or the like. The DSP 20 may also do standardized formatting for the audio signal to place it in a standardized digital form such as pulse code modulation (PCM).

SUMMARY OF THE INVENTION

In some embodiments of the present invention, audio circuits for a mobile terminal include a microphone and an audio signal processing circuit having an input coupled to the microphone. The audio signal processing circuit has a switchable portion and is configured to switch between a voice mode utilizing the switchable portion and a full fidelity mode not utilizing the switchable portion responsive to a mode signal coupled thereto.

In other embodiments of the present invention, the audio circuit further includes a controller that sets a first state of the mode signal to select voice mode when the mobile terminal is in use for a voice call and that sets a second state of the mode signal to select full fidelity mode responsive to a user request for full fidelity mode. The controller may also be configured to automatically select the first state responsive to initiation of the voice call and to switch to the second state of the mode signal during the voice call responsive to a user request to switch to full fidelity mode.

In further embodiments of the present invention, the controller is configured to initiate recording of an audio signal from the microphone in full fidelity mode responsive to a user request to record. The controller may also be configured to attach the recorded audio signal to a message for transmission from the mobile terminal. The controller may be configured to compress the recorded audio signal and store the compressed audio signal and to further compress the stored audio signal before attaching the recorded audio signal to the message for transmission.

In other embodiments of the present invention, the switchable portion includes a voice frequency band bandpass filter. In the full fidelity mode, the voice frequency band bandpass filter is not used and/or replaced by a broader spectrum filter selected to pass a full fidelity audio signal. The switchable portion may include a digital signal processor and, in the full fidelity mode, at least one of a plurality of audio signal processing operations performed by the digital signal processor on audio signals from the microphone may be deactivated. For example, the audio signal processing operations may include audio compression, comfort noise insertion and/or filtering. The audio signal processing operations in some embodiments includes comfort noise insertion and, in the voice mode, the controller is configured to replace portions of an audio signal from the microphone with comfort noise insertion for the voice call.

In yet further embodiments of the present invention, a mobile terminal is provided including an audio circuit as described previously. The mobile terminal further includes a portable housing with the audio circuit therein and a transceiver configured to transmit the message and transmit and receive signals associated with the voice call.

In other embodiments of the present invention, mobile terminals are provided including a portable housing and a transceiver configured to transmit data and to transmit and receive signals associated with a voice call. The audio processing circuit includes a selectable voice frequency band bandpass filter and a selectable digital processing circuit configured for audio signal processing operations including comfort noise insertion. The bandpass filter and audio processing operations are operative on an audio signal from a microphone operatively coupled to the audio processing circuit to generate a processed audio signal. The mobile terminals further include a controller configured to select a voice mode or a full fidelity mode of the audio signal processing circuit. The voice mode is automatically selected for the voice call and includes comfort noise insertion and the bandpass filter in generating the processed audio signal. The full fidelity mode is selected responsive to a user request and does not include the bandpass filter or comfort noise insertion in generating the processed audio signal.

In further embodiments of the present invention, the controller is configured to initiate recording of an audio signal from the microphone in full fidelity mode responsive to a user request to record. The controller may be configured to attach the recorded audio signal to a message for transmission from the mobile terminal and further may be configured to compress the recorded audio signal before attaching the recorded audio signal to the message for transmission. In some embodiments, the audio signal processing operations include audio compression and the voice mode includes audio compression and the full fidelity mode does not include audio compression.

In yet other embodiments of the present invention, methods are provided for operating an audio processing circuit for processing an audio signal from a microphone. A voice mode or a full fidelity mode for processing the audio signal from the microphone is selected. The audio signal is processed through a voice frequency band bandpass filter of the audio processing circuit in the voice mode. The voice frequency band bandpass filter is removed from the audio processing circuit for the audio signal in the full fidelity mode. The audio processing circuit may be included in a mobile terminal configured to transmit and receive audio signals associated with a voice call and the voice mode may be automatically selected by the mobile terminal during the voice call. The methods may further include performing audio compression and/or comfort noise insertion on the audio signal only in the voice mode.

While described above primarily with reference to apparatus and method aspects, it will be understood that the present invention also includes computer program products for operating an audio processing circuit for processing an audio signal from a microphone or auxiliary audio input.

DETAILED DESCRIPTION OF EXEMPLARY EMBODIMENTS

Figure 1:
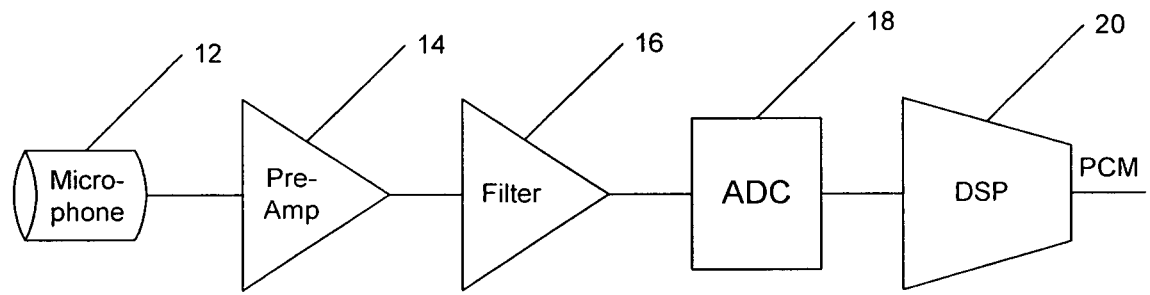
FIG. 1 is a schematic block circuit diagram illustrating a conventional audio processing circuit for a mobile terminal.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "mobile terminal" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "mobile terminals" may be portable, transportable, installed in a vehicle (aeronautical, maritime, or land-based), or situated and/or configured to operate locally and/or in a distributed fashion at any other location(s) on earth and/or in space. As used herein, a "mobile device" includes mobile terminals as well as mobile devices that do not support wireless communications.

Figure 2:
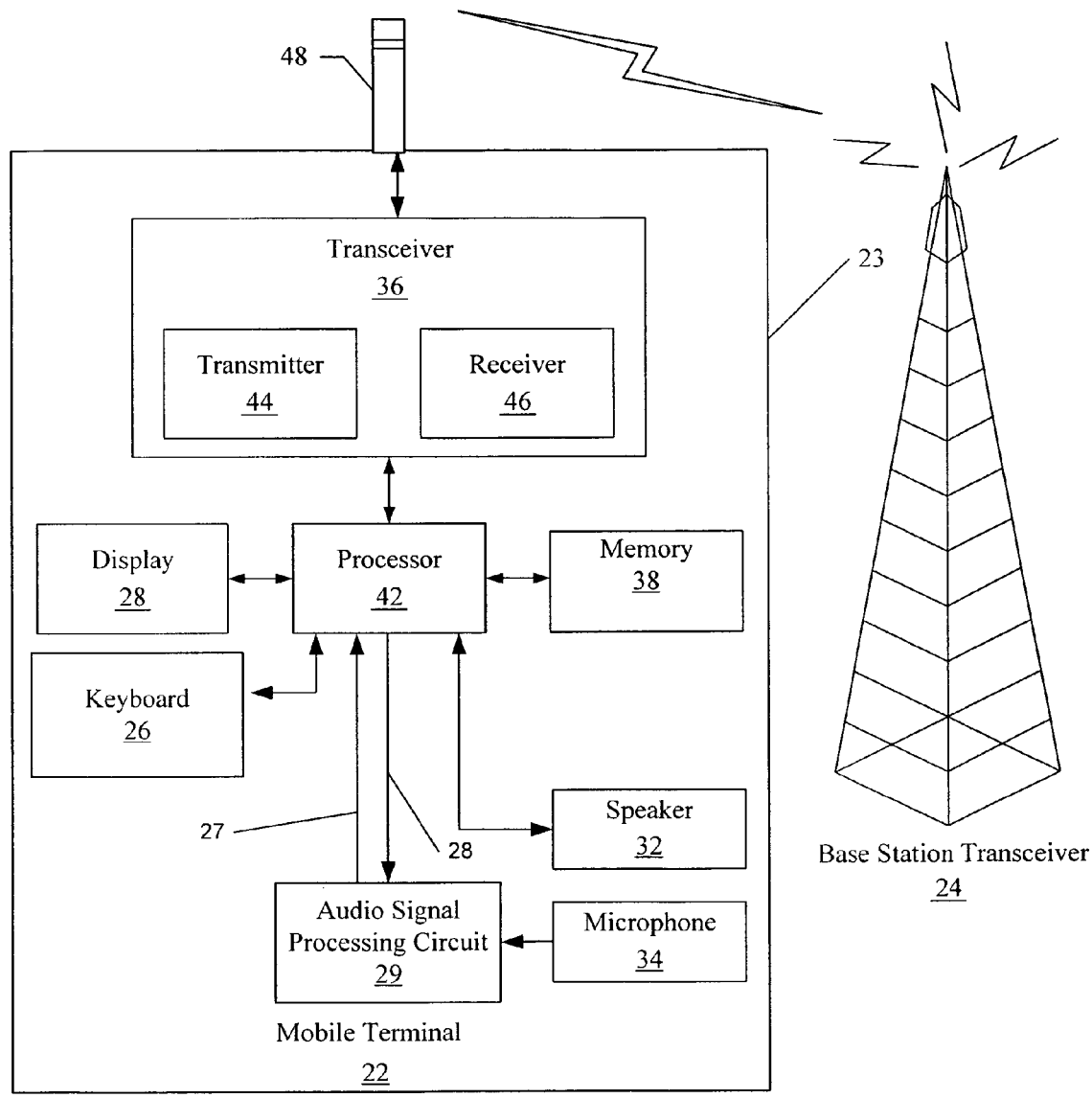
FIG. 2 is a schematic block diagram of a mobile terminal according to some embodiments of the present invention and an exemplary base station transceiver.

Embodiments of the present invention will now be described below with respect to FIGS. 2 through 4. Referring first to FIG. 2, a schematic block circuit diagram is provided illustrating a mobile terminal including an audio circuit in accordance with some embodiments of the present invention. FIG. 2 illustrates a mobile terminal 22 and a base station transceiver 24 of a wireless communications network. The mobile terminal 22 includes a portable housing 23 and may include, a keyboard 26, a display 28, a speaker 32, a microphone 34, a transceiver 36, and a memory 38, any of which may communicate with a processor (controller) 42. Furthermore, the mobile terminal 22 includes an audio signal processing circuit 29, which also communicates with the processor 42 to interface the microphone 34 with the processor 42.

An audio input 27 to the processor 42 and a mode signal 28 from the processor 42 are also shown in FIG. 2. The processor 42 can be any commercially available or custom microprocessor.

The transceiver 36 typically includes a transmitter circuit 44 and a receiver circuit 46, which respectively transmit outgoing radio frequency signals to the base station transceiver 24 and receive incoming radio frequency signals, such as voice call and data signals, from the base station transceiver 24 via an antenna 48. The antenna 48 may be an embedded antenna, a retractable antenna or any antenna known to those having skill in the art without departing from the scope of the present invention. The radio frequency signals transmitted between the mobile terminal 22 and the base station transceiver 24 may include both traffic and control signals (e.g., paging signals/messages for incoming calls), which are used to establish and maintain a voice call communication with another party or to transmit and/or receive data, such as e-mail or MMS messages, with a remote device. The processor 42 may support various functions of the mobile terminal 22, including functions related to the audio signal processing circuit 29 of the mobile terminal 22 according to some embodiments of the present invention.

In some embodiments of the present invention, the base station transceiver 24 is a radio transceiver(s) that defines an individual cell in a cellular network and communicates with the mobile terminal 22 and other mobile terminals in the cell using a radio-link protocol. Although only a single base station transceiver 24 is shown, it will be understood that many base station transceivers may be connected through, for example, a mobile switching center and other devices, to define a wireless communications network.

An audio circuit for a mobile device will now be described for some embodiments of the present invention with reference to the schematic block circuit diagram of FIG. 3. As shown in the embodiments of FIG. 3, the audio circuit 101 includes a microphone 112 and an audio signal processing circuit 125. The microphone 112 is coupled to an input of the audio signal processing circuit 125, in particular, to a preamplifier 114 of the audio signal processing circuit 125. The audio signal processing circuit 125 in the embodiments of FIG. 3 further includes a bandpass filter 116, an analog to digital converter (ADC) 118 and a digital signal processor (DSP) 120.

The illustrated embodiments of the audio signal processing circuit 125 further include a bypass switch 124. The bypass switch 124 and the DSP 120 are coupled to the input mode signal 28 that is provided to select a voice mode or a full fidelity mode of operations for the audio signal processing circuit 125.

Figure 3:
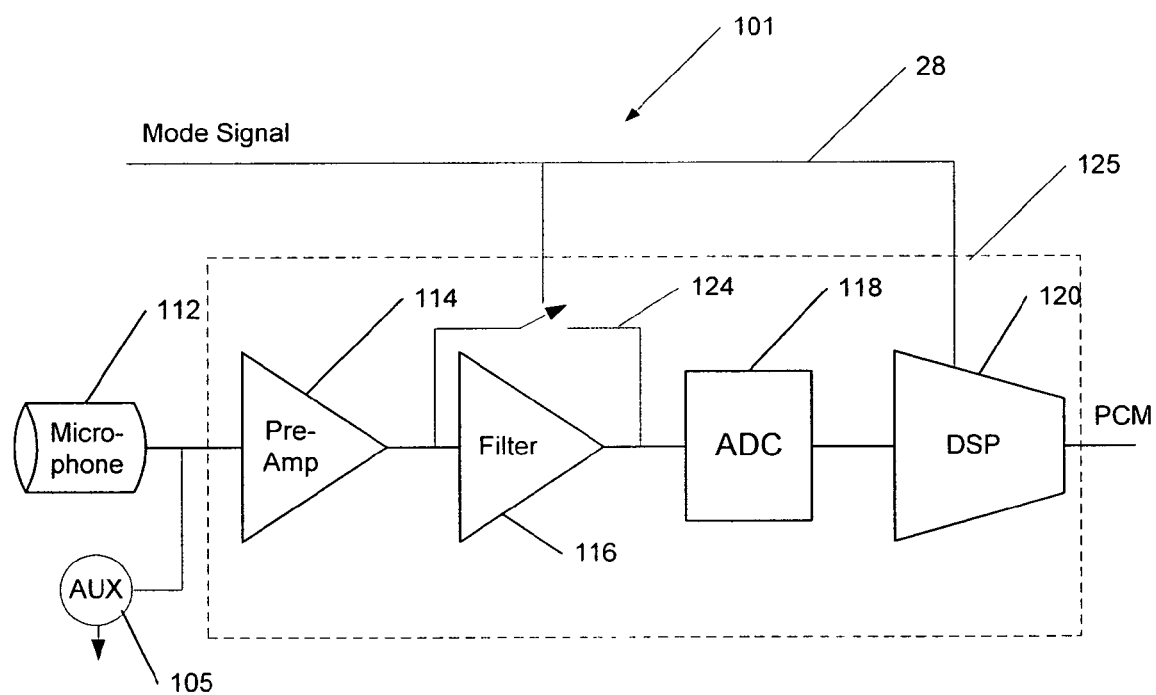
FIG. 3 is a schematic block circuit diagram illustrating an audio circuit for a mobile terminal according to some embodiments of the present invention.

The audio signal processing circuit 125 illustrated in FIG. 3 is configured to switch between a voice mode and a full fidelity mode. A switchable portion of the audio signal processing circuit 125, including the bandpass filter 116 and/or all or a portion of the DSP 120 are not utilized (i.e., not operatively included) in the processing of the audio signal from the microphone 112 (or the auxiliary input 105) in the full fidelity mode and are included in the voice mode.

While the microphone 34 is illustrated in FIG. 2 as being positioned within the housing 23 of the mobile terminal 22, it will be understood that the present invention is not limited to such built-in microphone configurations. For example, a microphone 112 could be coupled by wire to an audio input port of the mobile terminal 24 or operatively coupled to the audio signal processing circuit 125 using a wireless connection, such as with a Bluetooth headset or other hands-free device.

It will be understood that, while the bypass of the bandpass filter 116 is figuratively shown in FIG. 3 as through use of a mechanical switch 124, other approaches, such as an analog switch or other electronic circuit, fall within the scope of the present invention. For example, rather than fully removing the bandpass filter 116, the pass frequency band of the filter 116 may be modified and switching out of a portion of the audio signal processing circuit 125 may include switching a resistor, capacitor and/or the like within the bandpass filter 116 to change the frequency pass band thereof in the full fidelity mode. Similarly, as schematically illustrated in FIG. 3, the mode signal 28 may be a state input to the DSP 120 that changes operations thereof, such as affecting programmed operations executed thereon on an audio signal received from the ADC 118 to provide different signal filtering, audio compression and/or comfort noise insertion characteristics for the PCM signal output from the digital signal processor 120 responsive to the state of the mode signal 28.

As seen in FIG. 2, the mode signal 28 may be set at an output from the processor/controller 42 that may set a first state of the mode signal 28 to select the voice mode and the second state of the mode signal 28 to select the full fidelity mode. The controller 42 may, in some embodiments of the present invention, select the voice mode automatically when the mobile terminal 22 is in use for a voice call and may select the full fidelity mode responsive to a user request for full fidelity mode. For example, the user request may be received through the keyboard 26 or as a voice detection selection through the microphone 34 or through another user input device. In addition, the mode signal 28 may be set responsive to a user request received from the base station transceiver 24 over a wireless link through the transceiver 36. As such, the recording fidelity mode of the mobile terminal 22 may be requested by a remote user to switch between voice and full fidelity mode if the mobile terminal 22 is configured to accept such control.

The controller 42 may be configured to select the first/voice call state responsive to initiation of a voice call. In some embodiments, the controller 42 may be further configured to switch to the second/full fidelity state of the mode signal 28 even during a voice call responsive to a user request to switch to full fidelity mode.

In various embodiments of the present invention, the provision of a switchable audio signal processing circuit 125 may allow use of a full fidelity mode under particular circumstances when an audio communication is to be recorded or utilized that exceeds the voice frequency band. For example, a user of the mobile terminal 22 may desire to record a song with guitar accompaniment to send to a friend in an MMS message. With the conventional audio processing circuitry described with reference to FIG. 1, as a result of DSP processing, a guitar sound will likely be interpreted as background noise and filtered out, as its frequency generally lies outside the voice spectrum. Furthermore, soft passages and silence will typically be replaced with comfort noise, which may result in audio clipping of the singing with guitar accompaniment sound signal. Thus, a full fidelity mode may bypass the conventional analog and DSP filtering and noise reduction and may provide a microphone with a higher quality sound recording for the song with guitar accompaniment or the like.

Thus, various embodiments of the present invention provide a full fidelity microphone circuit that may be switched to a full fidelity mode under manual control or automatically, for example, when recording audio memos or videos with sound. When a voice call is made or received or full fidelity mode is otherwise not desired, a conventional audio path may be restored automatically or responsive to user request.

The controller 42, in various embodiments, may be configured to initiate recording of an audio signal from the microphone, such as the song with guitar accompaniment, in full fidelity mode responsive to user request to record. The controller 42 may further be configured to attach a recorded audio signal to a message, such as an MMS or email message, for transmission from the mobile terminal 22.

The controller 42 may also be configured to compress a recorded audio signal and to store the compressed audio signal, for example, in the memory 38. The full fidelity sound recording may be compressed, for example, to MP3 or 3GP form for local storage. Furthermore, in some embodiments of the present invention, the stored compressed audio signal may be further compressed before attaching the recorded audio signal to a message for transmission. The further compression could be initiated by a user attaching the full fidelity recorded sound to an MMS message for transmission over the air, with the further compression reducing file size so as to potentially reduce costs/bandwidth for transmission of the message.

Referring again to FIG. 3, in addition to the microphone 112, an auxiliary input 105 may be provided to receive an audio signal for processing by the audio signal processing circuit 125. In mobile terminals including switchable audio circuits according to various embodiments of the present invention, it may be desirable to add such a higher fidelity AUX input in light of the full fidelity mode capability of the subsequent signal processing circuit. Furthermore, while the output of the DSP 120 is shown as a PCM coded digital signal in FIG. 3, a variety of different forms of digital output for the processed audio signal may be utilized as will be understood by those of skill in the art. Furthermore, additional processing downstream of the DSP 120 may be provided to take a digital signal from the DSP 120 and convert it to a form such as PCM.

Thus, as generally described above, various embodiments of the present invention may provide a mobile terminal 22 in which a switchable audio signal processing circuit 29 has an input coupled to a microphone 112 and the audio signal processing circuit 125 includes a selectable voice frequency band bandpass filter 116 and a selectable digital processing circuit 120 that are configured for audio signal processing operations. The signal processing operations of the digital processing circuit 120 may include, for example, comfort noise insertion, audio compression, filtering and the like. The bandpass filter 116 and the audio processing circuit 120 may be operative on an audio signal from the microphone 112 or auxiliary input 105 to generate a processed audio signal, shown as a PCM signal in FIG. 3. The DSP or digital processing circuit 120 may be configured to use the mode signal 28 from the controller 42 to change processing from voice to full fidelity mode using software, hardware, and/or a combination thereof.

Methods for operating an audio processing circuit for processing an audio signal from a microphone according to various embodiments of the present invention will now be described with reference to the flow chart illustration of FIG. 4. As seen in FIG. 4, operations begin at Block 150 by selecting a voice mode or full fidelity mode for processing the audio signal from the microphone. The selection may be automatic or manual. For example, voice mode may be automatically selected for a voice call and full fidelity mode may be selected responsive to a user selection input.

In voice mode (Block 155), the audio signal is processed through a voice frequency band bandpass filter of the audio processing circuit (Block 160). Furthermore, audio compression and/or comfort noise insertion are also performed on the audio signal in the voice mode (Block 165). In contrast, in full fidelity mode (Block 165), the voice frequency band bandpass filter is removed from the audio processing circuit for the audio signal (Block 170). The voice frequency band bandpass filter may be removed by modifying the frequency band of the filter and still utilizing a front end filter or may be bypassed and the pre-amplified and unfiltered signal may be run to the analog to digital converter directly. Similarly, in full fidelity mode (Block 155), the digital signal processing operations are switched so as not to perform audio compression and/or comfort noise insertion on the audio signal (Block 175).

As will be appreciated by one of skill in the art, the present invention may be embodied as a method, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 4:
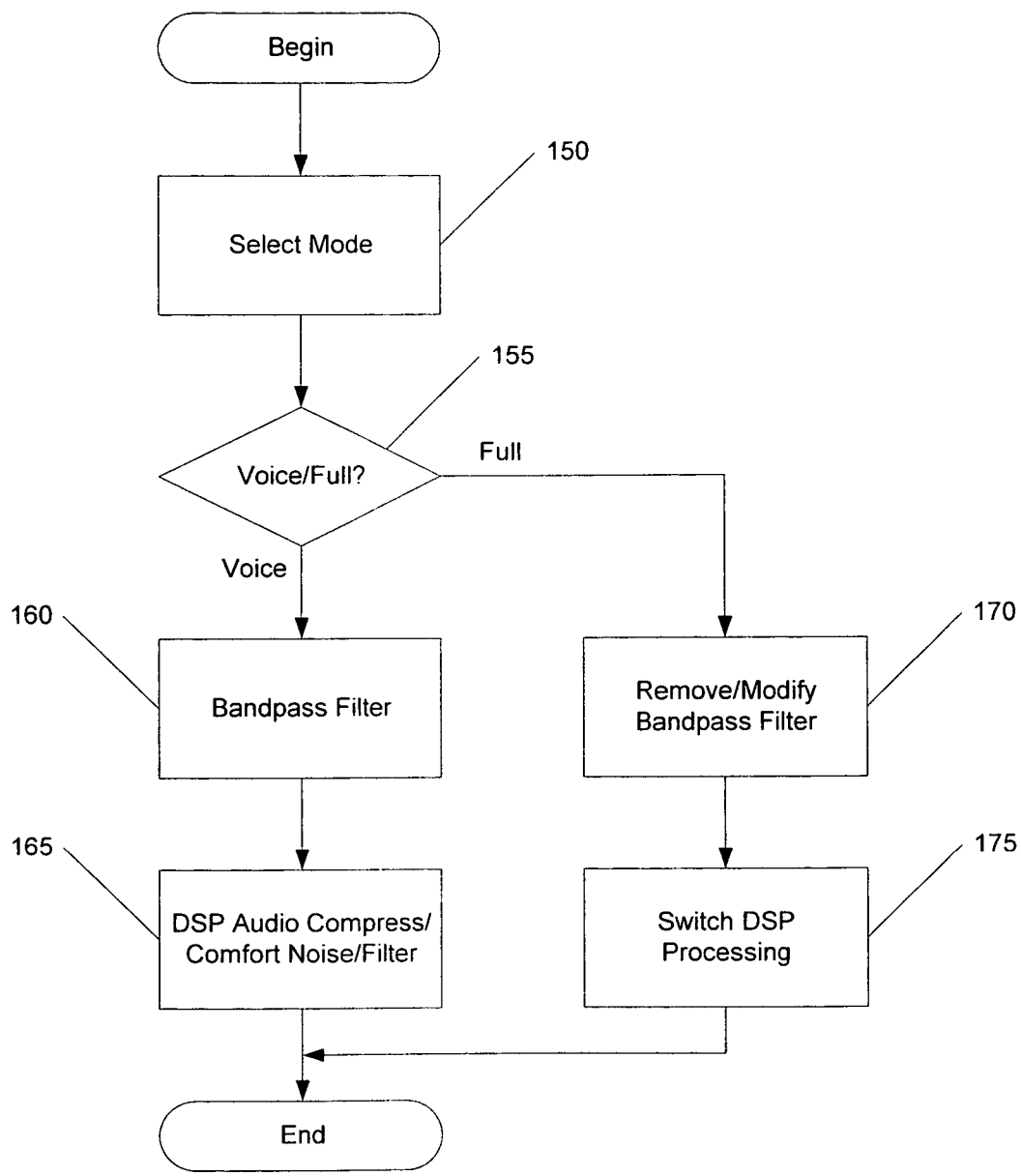
FIG. 4 is a flowchart illustrating methods for operating an audio processing circuit for processing an audio signal from a microphone according to some embodiments of the present invention.

The diagrams of FIGS. 2 through 4 illustrate the architecture, functionality, and operations of some embodiments of methods, systems, and computer program products for processing an audio signal. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. An audio circuit for a mobile terminal, comprising:
    a microphone;
    an audio signal processing circuit having an input coupled to the microphone, the audio processing circuit having a bandpass filter configured to pass through only a voice frequency band component of an audio signal from the microphone, and a switch that selects between a voice mode utilizing the bandpass filter and comfort noise insertion and a full fidelity mode bypassing the bandpass filter and comfort noise insertion responsive to a mode signal coupled thereto; and
    a controller that sets a first state of the mode signal to select the voice mode in response to the mobile terminal operating to handle a voice call and that sets a second state of the mode signal to select the full fidelity mode;
    wherein the controller is configured to automatically select the first state responsive to initiation of the voice call,
    wherein the controller is configured to switch to the second state of the mode signal during the voice call and while continuing the call responsive to a user input through a user interface in the mobile terminal, and
    wherein the controller is configured to select the full fidelity mode bypassing the bandpass filter and initiate recording of an audio signal from the microphone in the full fidelity mode responsive to a user request to record music, the music including frequencies that extend beyond a voice frequency band.

2. The audio circuit of claim 1, wherein the controller is configured to attach the recorded audio signal to a message for transmission from the mobile terminal.

3. The audio circuit of claim 2 wherein the controller is configured to compress the recorded audio signal and store the compressed audio signal and wherein the controller is further configured to further compress the stored audio signal before attaching the recorded audio signal to the message for transmission in response to a user request to attach the recorded audio signal for transmission from the mobile terminal.

4. The audio circuit of claim 1, wherein, in the full fidelity mode, a spectrum filter is selected to pass a full fidelity audio signal.

5. The audio circuit of claim 4, wherein the audio processing circuit comprises a digital signal processor and wherein, in the full fidelity mode, at least one of a plurality of audio signal processing operations performed by the digital signal processor on audio signals from the microphone are deactivated.

6. The audio circuit of claim 5 wherein the at least one of a plurality of audio signal processing operations includes audio coding, comfort noise insertion and/or filtering.

7. The audio circuit of claim 6 wherein the at least one of a plurality of audio signal processing operations includes comfort noise insertion and wherein, in the voice mode, the controller is configured to replace portions of an audio signal from the microphone with comfort noise insertion for the voice call.

8. A mobile terminal including the audio circuit of claim 1, the mobile terminal further comprising:
    a portable housing with the audio circuit therein;
    a transceiver configured to transmit a message and transmit and receive signals associated with the voice call.

9. A mobile terminal comprising:
    a portable housing;
    a transceiver configured to transmit data and to transmit and receive signals associated with a voice call;
    an audio signal processing circuit including a selectable voice frequency band bandpass filter and a selectable digital processing circuit configured for audio signal processing operations including comfort noise insertion, the bandpass filter and audio processing operations operative on an audio signal from a microphone operatively coupled to the audio processing circuit to generate a processed audio signal, wherein the bandpass filter is configured to pass through only a voice frequency band component of an audio signal from the microphone; and
    a controller configured to select a voice mode or a full fidelity mode of the audio signal processing circuit, wherein the voice mode is automatically selected responsive to initiation of the voice call and includes comfort noise insertion and use of the bandpass filter for generating the processed audio signal, wherein the full fidelity mode is selected responsive to a user request and bypasses the bandpass filter and comfort noise insertion in generating the processed audio signal, wherein the controller is configured to select the full fidelity mode during the voice call and while continuing the call responsive to a user input through a user interface in the mobile terminal, and wherein the controller is configured to initiate recording of an audio signal from the microphone in the full fidelity mode responsive to a user request to record music, the music including frequencies that extend beyond a voice frequency band.

10. The mobile terminal of claim 9, wherein the controller is configured to attach the recorded audio signal to a message for transmission from the mobile terminal.

11. The mobile terminal of claim 10 wherein the controller is configured to compress the recorded audio signal before attaching the recorded audio signal to the message for transmission.

12. The mobile terminal of claim 9 wherein the audio signal processing operations include audio coding, wherein the voice mode includes audio coding and the full fidelity mode does not include audio coding, and wherein the audio coding is configured to increase sound energy and is distinct from data compression.

13. A method for operating an audio processing circuit for processing an audio signal from a microphone of a mobile terminal, comprising:
    selecting a voice mode or a full fidelity mode for processing the audio signal from the microphone;

processing the audio signal through a voice frequency band bandpass filter, which is configured to pass through only a voice frequency band component of the audio signal from the microphone, of the audio processing circuit, and including comfort noise insertion, when operating in the voice mode;

bypassing the voice frequency band bandpass filter and comfort noise insertion and thereby sending the audio signal directly to an output node of an output signal pathway of the voice frequency band bandpass filter in the audio processing circuit when operating in the full fidelity mode, wherein selecting the voice mode or the full fidelity mode comprises automatically selecting the voice mode by the mobile terminal during the voice call, and selecting the full fidelity mode during the voice call and while continuing the call responsive to a user input through a user interface in the mobile terminal; and initiating recording of an audio signal from the microphone in the full fidelity mode responsive to a user request to record music, the music including frequencies that extend beyond a voice frequency band.

14. The method of claim 13 further comprising performing audio coding and/or comfort noise insertion on the audio signal only in the voice mode.

15. A computer program product for operating an audio processing circuit for processing an audio signal from a microphone, the computer program product comprising computer program code embodied in a non-transitory computer readable medium, the computer program code comprising program code configured to carry out the method of claim 13.

16. A computer program product for operating an audio processing circuit for processing an audio signal from a microphone, the computer program product comprising computer program code embodied in a non-transitory computer readable medium, the computer program code comprising program code configured to carry out the method of claim 14.

17. The audio circuit of claim 5, wherein the audio signal processing operations include audio coding, wherein the voice mode includes audio coding and the full fidelity mode does not include the audio coding, and wherein the audio coding is configured to increase sound energy and is distinct from data compression.

18. The method of claim 13 further comprising performing audio coding in the voice mode and excluding the audio coding in the full fidelity mode, wherein the audio coding is configured to increase sound energy and is distinct from data compression.

\* \* \* \* \*

UNITED STATES PATENT AND TRADEMARK OFFICE
CERTIFICATE OF CORRECTION

| | | |
|---|---|---|
| PATENT NO. | : 8,467,546 B2 | Page 1 of 1 |
| APPLICATION NO. | : 11/168125 | |
| DATED | : June 18, 2013 | |
| INVENTOR(S) | : Hyatt | |

It is certified that error appears in the above-identified patent and that said Letters Patent is hereby corrected as shown below:

<u>On Title Page:</u>
Item 73, Assignee: Please correct "Sony Corporation, Tokyo (JP)"

to read -- Sony Corporation, Tokyo (JP);
Sony Mobile Communications AB, Lund (SE) --

Signed and Sealed this
Twentieth Day of May, 2014

Michelle K. Lee
*Deputy Director of the United States Patent and Trademark Office*